US010336239B2

(12) United States Patent
Nakazawa et al.

(10) Patent No.: US 10,336,239 B2
(45) Date of Patent: Jul. 2, 2019

(54) VEHICLE LAMP AND VEHICLE HAVING THE SAME

(71) Applicant: KOITO MANUFACTURING CO., LTD., Tokyo (JP)

(72) Inventors: Misako Nakazawa, Shizuoka (JP); Takeshi Masuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 81 days.

(21) Appl. No.: 15/468,435

(22) Filed: Mar. 24, 2017

(65) Prior Publication Data
US 2017/0276310 A1 Sep. 28, 2017

(30) Foreign Application Priority Data

Mar. 25, 2016 (JP) ................. 2016-062065

(51) Int. Cl.
*B60Q 1/04* (2006.01)
*B60Q 1/00* (2006.01)
(Continued)

(52) U.S. Cl.
CPC ........... *B60Q 1/0035* (2013.01); *B60Q 1/085* (2013.01); *B60Q 1/143* (2013.01); *F21S 41/143* (2018.01);
(Continued)

(58) Field of Classification Search
CPC ...... B60Q 1/0035; B60Q 1/085; B60Q 1/143; F21S 41/24; F21S 41/323; F21S 41/275;
(Continued)

(56) References Cited

U.S. PATENT DOCUMENTS

2007/0070642 A1* 3/2007 Futami ................. F21S 41/162
362/514
2009/0290372 A1 11/2009 Kotajima et al.
(Continued)

FOREIGN PATENT DOCUMENTS

CN 101596880 A 12/2009
CN 104819422 A 8/2015
(Continued)

OTHER PUBLICATIONS

Office Action issued in Chinese Application No. 201710182515.1, dated Feb. 19, 2019 (16 pages).

*Primary Examiner* — Anabel Ton
(74) *Attorney, Agent, or Firm* — Osha Liang LLP

(57) ABSTRACT

A vehicle lamp comprises a first light source group for forward illumination comprising at least one light emitting element, a second light source group for road surface drawing comprising at least one light emitting element provided separately from the at least one light emitting element, a first projection lens through which light emitted from the first light source group is to pass, a second projection lens through which light emitted from the second light source group is to pass, and a light shade arranged between the first and second light source groups and the first and second projection lenses so that the lights from the first and second light source groups do not intersect with each other before entering the first and second projection lenses, respectively. Light distribution control functions of the first and second projection lenses are different from each other.

16 Claims, 15 Drawing Sheets

(51) Int. Cl.
*B60Q 1/08* (2006.01)
*B60Q 1/14* (2006.01)
*F21S 41/143* (2018.01)
*F21S 41/20* (2018.01)
*F21S 41/24* (2018.01)
*F21S 41/255* (2018.01)
*F21S 41/275* (2018.01)
*F21S 41/32* (2018.01)
*F21S 41/43* (2018.01)
*F21S 41/663* (2018.01)

(52) U.S. Cl.
CPC .............. *F21S 41/24* (2018.01); *F21S 41/255* (2018.01); *F21S 41/275* (2018.01); *F21S 41/285* (2018.01); *F21S 41/321* (2018.01); *F21S 41/322* (2018.01); *F21S 41/323* (2018.01); *F21S 41/43* (2018.01); *F21S 41/663* (2018.01); *B60Q 2300/42* (2013.01); *B60Q 2300/45* (2013.01); *B60Q 2400/50* (2013.01)

(58) Field of Classification Search
CPC ...... F21S 41/663; F21S 41/332; F21S 41/143; F21S 41/255; F21S 41/321; F21S 41/43; F21S 41/285

See application file for complete search history.

(56) References Cited

U.S. PATENT DOCUMENTS

| | | | |
|---|---|---|---|
| 2013/0003401 A1* | 1/2013 | Sekiguchi | F21S 48/1388 362/517 |
| 2013/0083553 A1* | 4/2013 | Sekiguchi | B60Q 1/0041 362/517 |
| 2013/0188380 A1* | 7/2013 | Sekiguchi | F21V 13/12 362/516 |
| 2015/0219301 A1 | 8/2015 | Honda | |
| 2017/0299137 A1* | 10/2017 | Kinoshita | B60Q 1/1423 |

FOREIGN PATENT DOCUMENTS

| | | |
|---|---|---|
| CN | 105276487 A | 1/2016 |
| JP | 2005-161977 A | 6/2005 |

\* cited by examiner

VEHICLE LAMP AND VEHICLE HAVING THE SAME

CROSS-REFERENCE TO RELATED APPLICATION

The present application claims the benefit of priority of Japanese Patent Application No. 2016-062065, filed on Mar. 25, 2016, the disclosure of which is incorporated herein by reference.

TECHNICAL FIELD

The disclosure relates to a vehicle lamp capable of illuminating a light distribution pattern for road surface drawing as well as a light distribution pattern for forward illumination of a vehicle with a single unit, and a vehicle having the vehicle lamp.

A Japanese Patent Application Publication No. 2005-161977 discloses a vehicle travel support device, which includes a locus estimation unit configured to estimate an own vehicle advancing locus and a low-speed moving object detection unit configured to detect a low-speed moving object such as a pedestrian and is configured to draw, on a road surface, a laser light to be emitted from a laser projector so that a predetermined illumination shape (for example, a stop line figure configured by a vertically long line) is made over a predetermined range around an intersection position of the own vehicle advancing locus with a moving locus of the low-speed moving object or a position in the vicinity of the intersection position.

As disclosed in the Japanese Patent Application Publication No. 2005-161977, the device configured to draw a predetermined mark on the road surface by using the laser light is mounted separately from a usual lamp for forward illumination. Therefore, it is necessary to secure a space in a lamp unit such as a headlight.

SUMMARY OF THE INVENTION

It is therefore an object of the disclosure to provide a vehicle lamp capable of forming a light distribution pattern for road surface drawing as well as a light distribution pattern for forward illumination of a vehicle with a single unit, and a vehicle having the vehicle lamp.

The present application provides a vehicle lamp comprises a first light source group for forward illumination comprising at least one light emitting element, a second light source group for road surface drawing comprising at least one light emitting element provided separately from the at least one light emitting element, a first projection lens through which light emitted from the first light source group is to pass, a second projection lens through which light emitted from the second light source group is to pass, and a light shade arranged between the first and second light source groups and the first and second projection lenses so that the light from the first light source group and the light from the second light source group do not intersect with each other before entering the first projection lens and the second projection lens, respectively, wherein a light distribution control function of the first projection lens and a light distribution control function of the second projection lens are different from each other.

According to this configuration, since it is possible to form a light distribution pattern for road surface drawing as well as a light distribution pattern for forward illumination of a vehicle with a single unit, it is possible to save a space while satisfying both functions of the forward illumination and the road surface drawing.

In the vehicle lamp, a position of a back focal point of the first projection lens and a position of a back focal point of the second projection lens may be different from each other.

According to this configuration, the first light source group and the second light source group are positioned in the vicinities of the back focal points of the first projection lens and the second projection lens, respectively, so that it is possible to obtain the clear light distribution patterns.

In the vehicle lamp, the first projection lens and the second projection lens may be integrally formed.

According to this configuration, it is possible to satisfy a plurality of different light distribution control functions by a single projection lens.

In the vehicle lamp, a non-transparent region through which the lights emitted from the first light source group and the second light source group are not to pass may be formed between the first projection lens and the second projection lens.

According to this configuration, it is possible to prevent an unintended light distribution, which is caused due to the light incident on a boundary between the first projection lens and the second projection lens.

In the vehicle lamp, the non-transparent region may be a vapor-deposited surface of a reflecting material formed on an incident surface or an output surface between the first projection lens and the second projection lens.

According to this configuration, the non-transparent region is formed as a vapor-deposited surface (for example, metal vapor-deposited surface), so that it is possible to further prevent an unintended light distribution.

In the vehicle lamp, the first projection lens may be formed with a first diffusion step configured to extend a light source image of the first light source group subequally in a right and left direction of the lamp and in an upper and lower direction of the lamp, and the second projection lens may be formed with a second diffusion step configured to further extend a light source image of the second light source group in the upper and lower direction of the lamp than in the right and left direction of the lamp.

The vehicle lamp may further comprises a first additional optical system provided to be close to the first light source group between the first light source group and the projection lens, the first additional optical system may be configured to further extend a light source image of the first light source group in a right and left direction of the lamp than in an upper and lower direction of the lamp, and the second projection lens may be formed with a second diffusion step configured to further extend a light source image of the second light source group in the upper and lower direction of the lamp than in the right and left direction of the lamp.

According to this configuration, it is possible to form the light distribution pattern extending so that it becomes parallel light, which is substantially the same in the right and left direction and the upper and lower direction, as the light distribution pattern for forward illumination, while forming the light distribution pattern further extending in the upper and lower direction than in the right and left direction, as the light distribution pattern for road surface drawing.

In the vehicle lamp, the first additional optical system may be configured by an additional lens having an incident surface arranged to face the first light source group and an output surface arranged to face the projection lens, and the output surface may be formed with a third diffusion step configured to extend the light source image of the first light source group.

In the vehicle lamp, the first additional optical system may be configured by a reflector having openings, which are respectively formed on a surface arranged to face the first light source group and a surface arranged to face the projection lens, and the opening formed on the surface arranged to face the projection lens may have a width in the right and left direction of the lamp greater than a width in the upper and lower direction of the lamp.

In the vehicle lamp, the first additional optical system may be configured by a cylindrical lens, and the cylindrical lens may be arranged so that a focal line direction thereof is parallel with the right and left direction of the lamp.

In the vehicle lamp, the first additional optical system may be configured by a cylindrical lens, and the cylindrical lens may be arranged so that a focal line direction thereof is parallel with the right and left direction of the lamp.

According to this configuration, it is possible to obtain the light distribution pattern for forward illumination with the simple configuration.

The vehicle lamp may further comprises a first additional optical system arranged between the first light source group and the first projection lens and a second additional optical system arranged between the second light source group and the second projection lens, the first additional optical system may be configured to further extend a light source image of the first light source group in a right and left direction of the lamp than in an upper and lower direction of the lamp, and the second additional optical system may be configured to further extend a light source image of the second light source group in the upper and lower direction of the lamp than in the right and left direction of the lamp.

According to this configuration, it is possible to obtain the desired light distribution patterns for forward illumination and road surface drawing by a combination of the first additional optical system and the second additional optical system.

In the vehicle lamp, the light shade may have a first surface arranged to face toward the first light source group and a second surface arranged to face toward the second light source group, and a high-reflectivity treatment may have been performed for one or both of the first surface and the second surface.

According to this configuration, since the light reflected on the light shade can also be used for light distribution, it is possible to widen an illumination range of each light distribution pattern, which is to be formed by each light of the first light source group and the second light source group.

In the vehicle lamp, the light shade may have a first surface arranged to face toward the first light source group and a second surface arranged to face toward the second light source group, and a low-reflectivity treatment may have been performed for one or both of the first surface and the second surface.

According to this configuration, a situation where the light from the first light source group gets into the second region of the projection lens or the light from the second light source group enters the first region of the projection lens does not occur. Therefore, it is possible to prevent an unintended light distribution.

In the vehicle lamp, the first light source group may comprises a plurality of light emitting elements, and the plurality of light emitting elements may be positioned at a rear side relative to a back focal point of the first projection lens in a front and rear direction of the lamp.

According to this configuration, the respective light distribution patterns, which are to be formed by the respective light emitting elements of the first light source group, are illuminated with being partially overlapped. Therefore, it is possible to suppress a non-illumination range between the respective light distribution patterns.

The present application also provides a vehicle having the vehicle lamp mounted to one side of right and left sides of a front side of the vehicle and a lamp for forward illumination mounted to the other side.

Regarding the pair of lamps mounted at right and left sides of the front of the vehicle, one lamp is mounted with a multi-functional lamp unit having two functions of the forward illumination and the road surface drawing and the other lamp is mounted with a single-function lamp unit for forward illumination. Therefore, it is possible to secure the luminous intensity of the light distribution for forward illumination while satisfying both the functions of the forward illumination and the road surface drawing.

According to the disclosure, it is possible to provide the vehicle lamp capable of forming the light distribution pattern for road surface drawing as well as the light distribution pattern for forward illumination of a vehicle with a single unit, and the vehicle having the vehicle lamp.

DETAILED DESCRIPTION

Hereinafter, illustrative embodiments of the disclosure will be described in detail with reference to the drawings.

Figure 1:
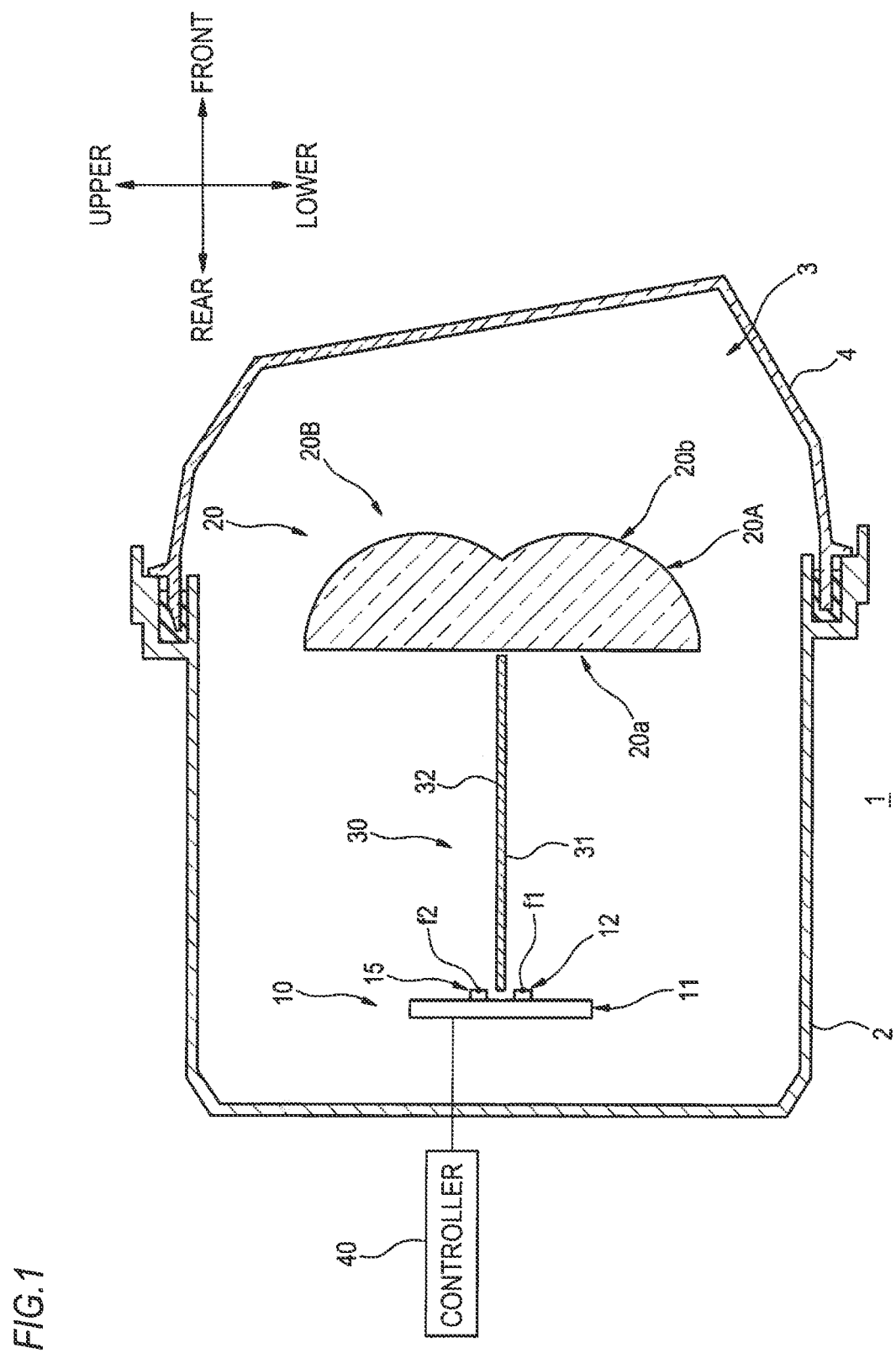
FIG. 1 is a vertically sectional view depicting a schematic structure of a vehicle lamp in accordance with an illustrative embodiment of the disclosure.
Figure 2:
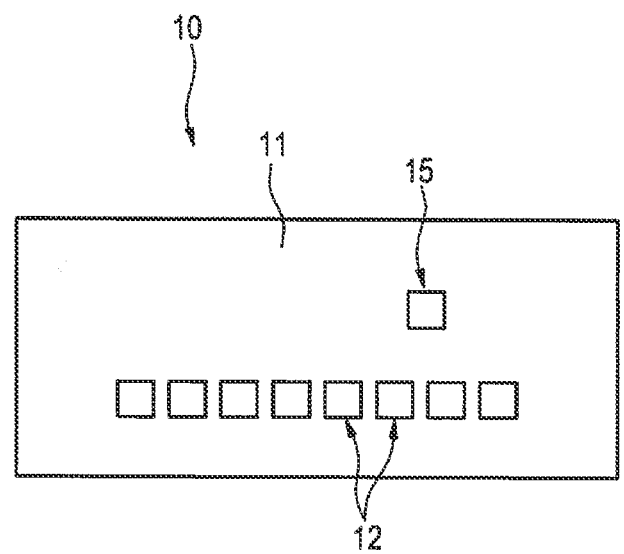
FIG. 2 is a front view of a light source unit of the illustrative embodiment.

FIG. 1 is a vertically sectional view depicting a schematic structure of a vehicle lamp in accordance with an illustrative embodiment of the disclosure, and FIG. 2 is a front view of a light source unit of the illustrative embodiment.

A vehicle lamp 1 of the illustrative embodiment is a lamp unit for road surface drawing (road surface drawing device) mounted to at least one of a pair of headlights arranged at right and left sides of a front of a vehicle. FIG. 1 depicts a structure of the lamp unit for road surface drawing mounted to one headlight, as the vehicle lamp 1.

As shown in FIG. 1, the vehicle lamp 1 includes a lamp body 2 having an opening formed at a front side of the vehicle and a transparent cover 4 attached so as to cover the opening of the lamp body 2. The transparent cover 4 is formed of resin, glass or the like having transparency. In a lamp chamber 3 formed by the lamp body 2 and the transparent cover 4, a light source unit 10, a projection lens 20 and a light shade 30 are accommodated. The respective constitutional elements are attached to the lamp body 2 by a support mechanism (not shown).

As shown in FIGS. 1 and 2, the light source unit 10 includes a circuit board 11 and a first light source group 12 and a second light source group 15 mounted on the circuit board 11. The first light source group 12 is configured by a plurality of LED chips (eight LED chips, herein) (an example of the light emitting element) arranged along a right and left direction of the vehicle lamp 1. Also, the second light source group 15 is configured by one LED chip (an example of the light emitting element) arranged above the first light source group 12, for example. In the meantime, the first and second light source groups 12, 15 may be configured by semiconductor light emitting elements other than the LED chips. Also, the numbers of the LED chips configuring the first and second light source group 12, 15 are not limited to the shown example. As shown in FIG. 2, each of the LED chips configuring the first light source group 12 and the second light source group 15 has a substantially square-shaped light emitting surface. In the meantime, each LED chip may have a light emitting surface other than the square shape, such as a rectangular shape. A light source image that is to be formed by light from each LED chip preferably has an aspect ratio of 0.5 to 1.5, which is a ratio of a width in an upper and lower direction to a width in the right and left direction, when a width of the vehicle in the right and left direction is set to 1. Also, the respective LED chips can be individually turned on and off, in response to a control signal from a controller 40.

As shown in FIG. 1, the projection lens 20 has an incident surface 20a and an output surface 20b. The incident surface 20a is arranged to face the light emitting surfaces of the first light source group 12 and the second light source group 15, and the output surface 20b is arranged to face ahead of the lamp. The output surface 20b of the projection lens 20 is formed to have a non-spherical surface shape so that the light from the first light source group 12 and the light from the second light source group 15 are to be emitted with being continuously refracted in predetermined directions relative to incident angles of the lights. When a region of the projection lens 20 through which the light from the first light source group 12 is to pass is referred to as a first region 20A and a region of the projection lens 20 through which the light from the second light source group 15 is to pass is referred to as a second region 20B, the projection lens 20 is configured as a lens of which the first region 20A and the second region 20B have different light distribution control functions on the output surface 20b. The projection lens 20 can have a desired light distribution characteristic by appropriately determining a surface shape of the incident surface 20a or the output surface 20b, for example. For instance, in the illustrative embodiment, the projection lens 20 serves as a diffusing lens in the upper and lower direction and the right and left direction of diffusing the light in the upper and lower direction of the lamp and in the right and left direction of the lamp, in the first region 20A, and as a diffusing lens in the upper and lower direction of diffusing the light in the upper and lower direction of the lamp, in the second region 20B. In the meantime, the projection lens 20 of the illustrative embodiment is preferably configured so that a position of a back focal point f1 of the first region 20A and a position of a back focal point f2 of the second region 20B are different from each other and the first light source group 12 and the second light source group 15 are respectively arranged at the back focal points f1, f2.

The light shade 30 is a flat plate-shaped member arranged between the light source unit 10 and the projection lens 20. The light shade 30 is provided at a position at which the light from the first light source group 12 and the light from the second light source group 15 do not intersect with each other before entering the projection lens 20. That is, in the vertically sectional view of FIG. 1, the light shade 30 has a width greater than a parallel width of the first light source group 12 consisting of the plurality of LED chips by a predetermined magnitude or greater and is arranged to extend from a region between the first light source group 12 and the second light source group 15 to the vicinity of the incident surface 20a of the projection lens 20. A lower surface 31 and an upper surface 32 of the light shade 30 have been subjected to lusterless black coating or the like for low-reflectivity treatment. Thereby, the lights from the first light source group 12 and the second light source group 15 are respectively absorbed on the upper and lower surfaces 31, 32 of the light shade 30.

The lighting and lights-out of the respective LED chips configuring the first light source group 12 and the second light source group 15, emission intensity adjustment of the lights from the respective LED chips and blinking rate adjustment of the LED chips are performed by the controller 40. Thereby, the controller 40 can change the individual lighting and lights-out of the respective LED chips and the intensities and blinking rates of the respective LED chips. The controller 40 is implemented by a device and a circuit such as a CPU of a computer, a storage unit and the like, as a hardware configuration, and is implemented by a computer program or the like, as a software configuration. In the meantime, the controller 40 is provided outside the lamp chamber 3, as shown in FIG. 1. However, the controller 40 may be provided inside the lamp chamber 3. The controller 40 is configured to receive signals from a lamp switch and the like (not shown) and to transmit a variety of controls signals to the respective LED chips, in response to the received signals.

Figure 3:
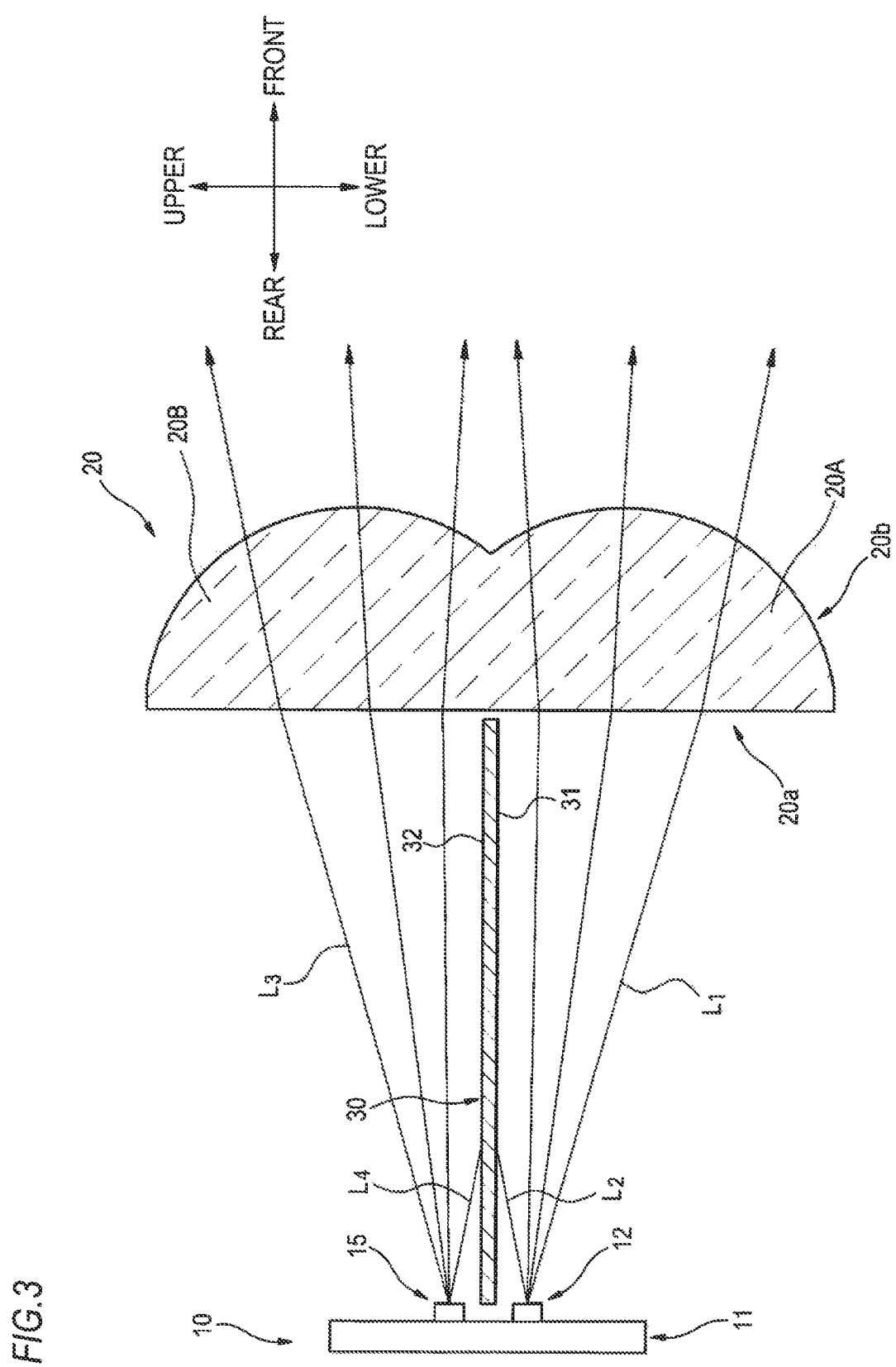
FIG. 3 is a vertically sectional view depicting light paths of lights that are to be emitted from the light sources of the vehicle lamp in accordance with the illustrative embodiment.

As shown in FIG. 3, the lights $L_1$ emitted from each LED chip of the first light source group 12 passes a region below the lower surface 31 of the light shade 30, is incident from the incident surface 20a of the projection lens 20 and is then emitted from the output surface 20b. That is, the light $L_1$ emitted from the first light source group 12 passes through the first region 20A of the projection lens 20. Since the first region 20A of the projection lens 20 serves as the diffusing lens in the upper and lower direction and the right and left direction, a light source image that is to be formed by the light $L_1$ passes through the first region 20A, so that it extends subequally in the upper and lower direction and in the right and left direction. In the meantime, since the light $L_2$ emitted upwards from the first light source group 12 is absorbed by the lower surface 31 of the light shade 30, the light $L_2$ is little incident on the projection lens 20.

Also, as shown in FIG. 3, the light $L_3$ emitted from the second light source group 15 passes a region above the upper surface 32 of the light shade 30, is incident from the incident surface 20a of the projection lens 20, and is then emitted from the output surface 20b. That is, the light $L_3$ emitted from the second light source group 15 is incident on the second region 20B of the projection lens 20. Since the second region 20B of the projection lens 20 serves as the diffusing lens in the upper and lower direction, a light source image that is to be formed by the light $L_3$ passes through the second region 20B, so that it further extends in the upper and lower direction than in the right and left direction. In the meantime, since the light $L_4$ emitted downwards from the second light source group 15 is absorbed by the upper surface 32 of the light shade 30, the light $L_4$ is little incident on the projection lens 20.

Figure 4:
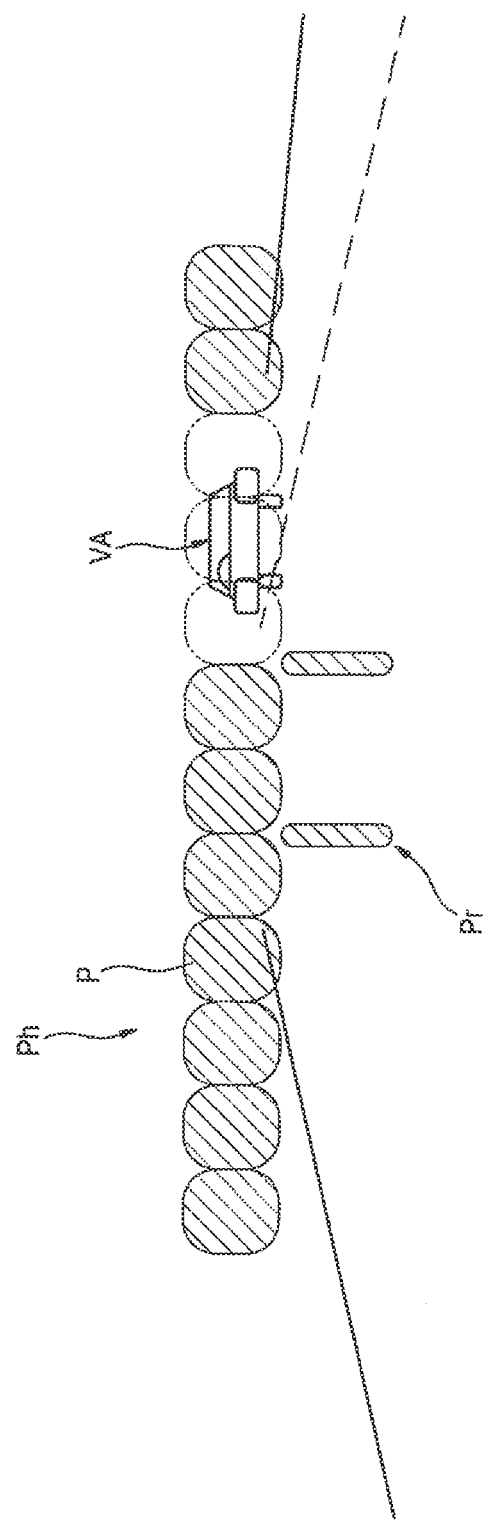
FIG. 4 depicts an example of respective light distribution patterns, which are to be formed by light emitted from a first light source group of the illustrative embodiment and by light emitted from a second light source group.

FIG. 4 depicts an example of respective light distribution patterns, which are formed by the light emitted from the first light source group and by the light emitted from the second light source group.

As described above, the light $L_1$ from each LED chip of the first light source group 12 is diffused so as to form a light source image extending subequally in the upper and lower direction and in the right and left direction and is illuminated ahead of the lamp. That is, the light source image of each LED chip of the first light source group 12 forms a light distribution pattern P having a substantially quadrangular shape on a virtual screen in front of the vehicle. Since the respective LED chips of the first light source group 12 are arranged along the right and left direction of the vehicle lamp 1, when all the LED chips are turned on, it is possible to form a horizontally long light distribution pattern Ph (for example, a high beam light distribution pattern) of which the light distribution patterns P having a substantially quadrangular shape are arranged in parallel in the right and left direction. Also, when the respective LED chips of the first light source group 12 are individually turned on and off by the control signal from the controller 40, it is possible to turn off a light only in a region in which an oncoming vehicle VA exists, as shown in FIG. 4, so that it is possible to prevent the glare to the oncoming vehicle VA.

As shown in FIG. 4, the light $L_3$ from the second light source group 15 is diffused so as to form a light source image further extending in the upper and lower direction than in the right and left direction and is illuminated ahead of the lamp. That is, the light source image from the second light source group 15 can form a rectangular (linear) light distribution pattern Pr flintier extending in the upper and lower direction than in the right and left direction. The linear light distribution pattern Pr has an aspect ratio of 5 or greater, which is a ratio of a width in a front and rear direction to a width in the right and left direction, when a width of the vehicle in the right and left direction is set to 1, for example. Regarding the aspect ratio of the linear light distribution pattern. Pr, the aspect ratio of the width in the front and rear direction to the width in the right and let direction is particularly preferably 1:10 or greater. Thereby, for example, the linear light distribution pattern Pr can illuminate a range from 10 m to 100 m ahead of the vehicle. When a vertically long linear light distribution pattern having an aspect ratio greater than the above-exemplified aspect ratio is required, it is possible to cope with the requirement by increasing the aspect ratio of the light source image, in addition to a method of changing a magnification of the light source image of the projection lens 20. For example, when the width of the vehicle in the right and left direction is set to 1, the aspect ratio of the light source image, which is to be formed by the light from the LED chip configuring the second light source group 15, i.e., the aspect ratio of the width in the upper and lower direction to the width in the right and left direction can be set to 1.5 to 5, for example. As the method of changing the aspect ratio of the light source image, the above aspect ratio can be implemented by a shape of the LED chip of the second light source group 15 or by arranging a plurality of LED chips in parallel.

In the meantime, the second light source group 15 may be configured by two LED chips and two linear light distribution patterns Pr may be formed by the two LED chips. Thereby, as shown in FIG. 4, it is possible to draw two parallel lines corresponding to a width of the vehicle on the road surface. Also, the vehicle lamp 1 may be respectively mounted on the right and left headlights of the vehicle and the linear light distribution patterns Pr may be formed to draw two lines by the respective lamps 1.

As described above, according to the illustrative embodiment, the vehicle lamp 1 includes the first light source group 12 for forward illumination, the second light source group 15 for road surface drawing, the projection lens 20 through which the lights emitted from the first light source group 12 and the second light source group 15 are to pass, and the light shade 30 arranged between the first light source group 12 and second light source group 15 and the projection lens 20 so that the light L from the first light source group 12 and the light L from the second light source group 15 do not intersect with each other before entering the projection lens 20. The light distribution control function of the first region 20A of the projection lens 20 and the light distribution control function of the second region 20B are different from each other. According to this configuration, since it is possible to form the light distribution pattern for forward illumination Ph and the light distribution pattern for road surface drawing Pr with a single unit, it is possible to save a space while satisfying both functions of the forward illumination and the road surface drawing. Also, the light shade 30 is arranged between the light source unit 10 and the projection lens 20 so that the light $L_1$ from the first light source group 12 and the light $L_3$ from the second light source group 15 do not intersect with each other before entering the projection lens 20. Therefore, it is possible to prevent an unintended light distribution, which is caused when the light from the first light source group 12 is incident on the second region 20B of the projection lens 20 or the light from the second light source group 15 is incident on the first region 20A of the projection lens 20.

Also, in the illustrative embodiment, since the output surface 20b of the projection lens 20 has a non-spherical surface shape, the position of the back focal point f1 of the first region 20A and the position of the back focal point f2 of the second region 20B are different from each other. For this reason, it is possible to obtain the clear light distribution patterns Ph, Pr by arranging the first light source group 12 mounted on the circuit board 11 in the vicinity of the back focal point f1 of the first region 20A and positioning the second light source group 15 in the vicinity of the back focal point 12 of the second region 20B.

Figure 5:
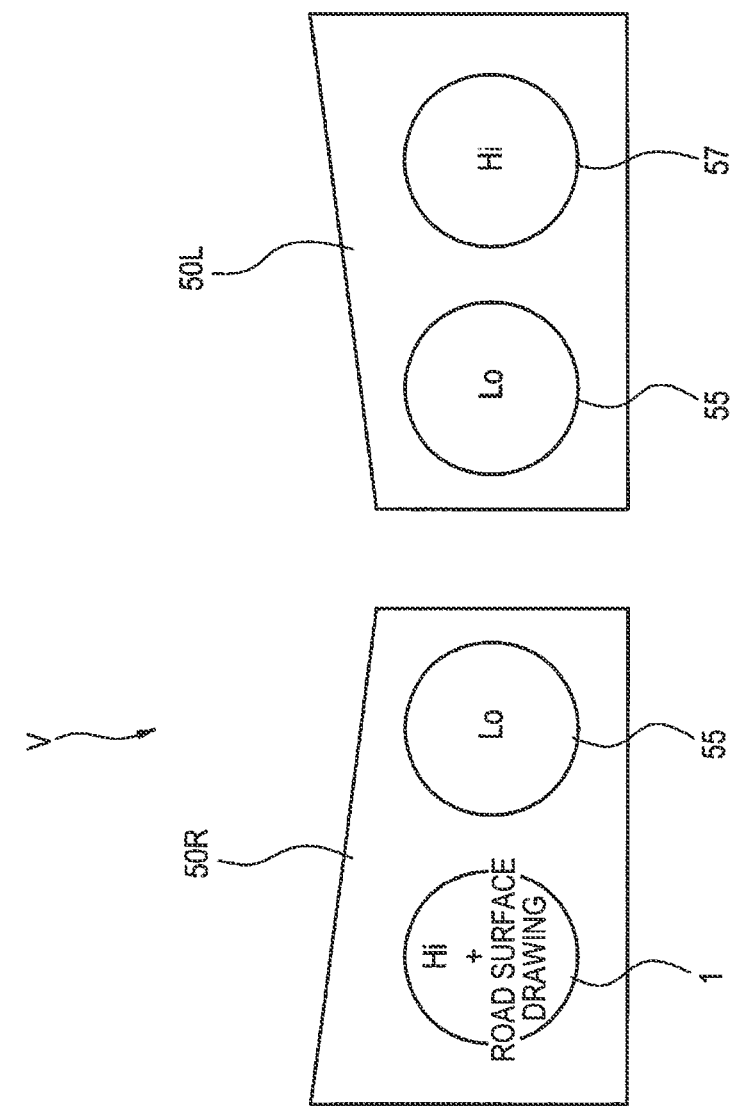
FIG. 5 depicts an example where the vehicle lamp of the illustrative embodiment is mounted on a vehicle.

FIG. 5 depicts an example where the vehicle lamp of the illustrative embodiment is mounted on a vehicle.

As shown in FIG. 5, a vehicle V has a pair of headlights 50L, 50R arranged at right and left sides of the front thereof. For example, the vehicle lamp 1 having both functions of high beam light distribution and road surface drawing in accordance with the illustrative embodiment and a lamp for low beam 55 configured to form a low beam light distribution are mounted in the right headlight 50R. Meanwhile, a lamp for low beam 55 and a lamp for high beam 57 configured to form a high beam light distribution are mounted in the left headlight 50L. In this way, the multifunctional vehicle lamp 1 having functions of high beam and road surface drawing is mounted to any one of the left and right headlights 50L, 50R, so that it is possible to miniaturize the headlights 50L, 50R, as compared to the related art where a lamp for high beam and a lamp for road surface drawing are separately provided. Also, the lamp for low beam 55 and the lamp for high beam 57 are mounted in the headlight (the left headlight 50L, in this example) in which the vehicle lamp 1 is not mounted. Therefore, the left headlight 50L satisfies the required luminous intensity of the high beam light distribution.

In the meantime, a swivel mechanism configured to swivel a light distribution direction of the vehicle lamp 1 in the left and right direction may be provided and the swivel mechanism may be configured to mechanically swivel the vehicle lamp 1, so that it is possible to move the light distribution direction (the direction of the optical axis Ax of the projection lens 20) in the right and left direction. Thereby, it is possible to arbitrarily change the illumination directions of the lights for forming the light distribution pattern for high beam Ph and the linear light distribution pattern Pr. For this reason, for example, it is possible to draw the linear light distribution pattern Pr on the road surface toward a direction in which a target such as a pedestrian is detected.

Figure 6A:
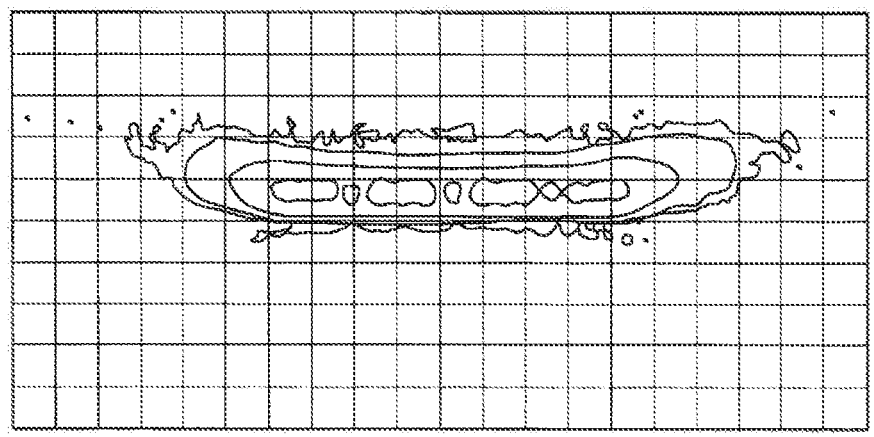
FIG. 6A depicts a light distribution pattern, which is formed by the light from the first light source group when a high-reflectivity treatment has not been performed for a light shade.
Figure 6B:
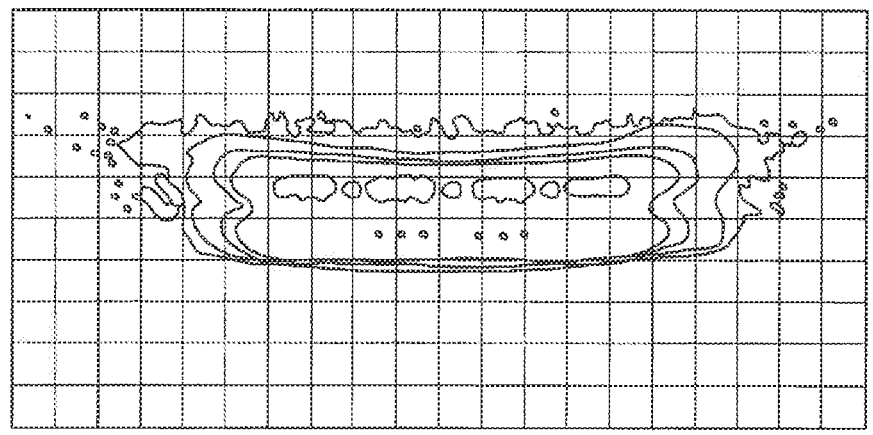
FIG. 6B depicts a light distribution pattern, which is formed by the light from the first light source group when the high-reflectivity treatment has been performed for the light shade.
Figure 7A:
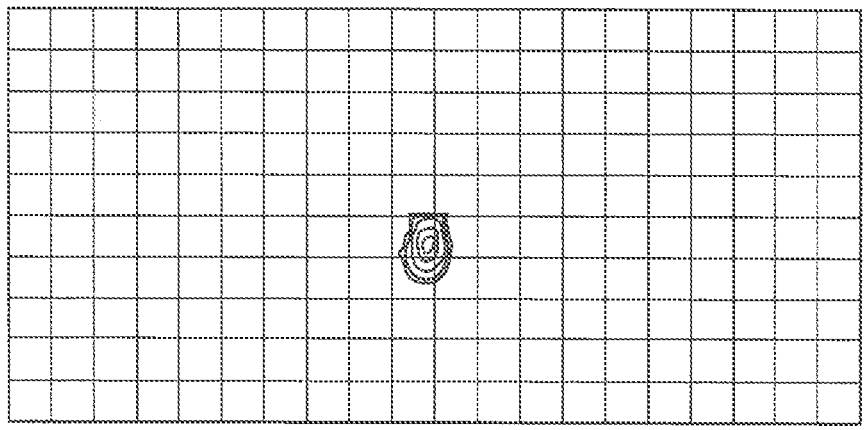
FIG. 7A depicts a light distribution pattern, which is formed by the light from the second light source group when a high-reflectivity treatment has not been performed for the light shade.
Figure 7B:
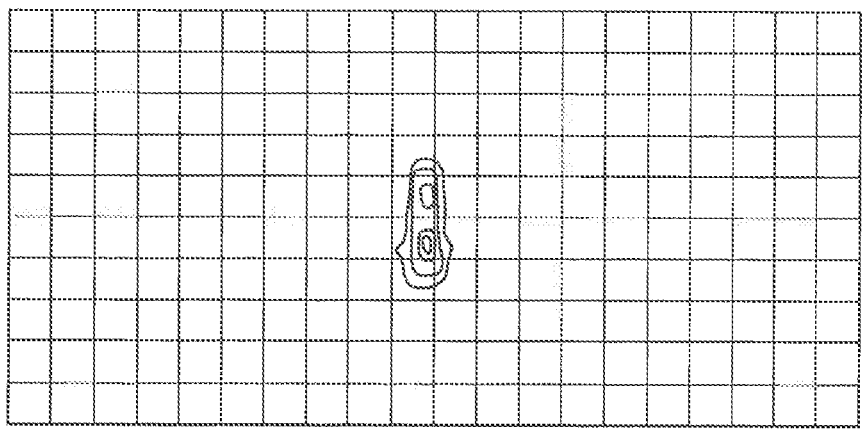
FIG. 7B depicts a light distribution pattern, which is formed by the light from the second light source group when the high-reflectivity treatment has been performed for the light shade.

FIGS. 6 and 7 depict (illuminance distributions) of light distribution patterns projected on a virtual screen provided in front of the vehicle lamp 1 and formed by the vehicle lamp 1. FIG. 6A depicts an illuminance distribution on the virtual screen of a light distribution pattern, which is formed by the light from the first light source group when the high-reflectivity treatment has not been performed for the light shade, and FIG. 6B depicts an illuminance distribution on the virtual screen of a light distribution pattern, which is formed by the light from the first light source group when the high-reflectivity treatment has been performed for the light shade. FIG. 7A depicts an illuminance distribution on the virtual screen of a light distribution pattern, which is formed by the light from the second light source group when the high-reflectivity treatment has not been performed for the light shade, and FIG. 7B depicts an illuminance distribution on the virtual screen of a light distribution pattern, which is formed by the light from the second light source when the high-reflectivity treatment has been performed for the light shade.

In the illustrative embodiment, the low-reflectivity treatment has been performed for the lower surface 31 and the upper surface 32 of the light shade 30. However, the disclosure is not limited thereto. For example, the high-reflectivity treatment such as metal vapor deposition may be performed for the lower surface 31 and the upper surface 32 of the light shade 30. In this case, the light emitted from the first light source group 12 and reflected on the lower surface 31 of the light shade 30 is incident on the first region 20A of the incident surface 20a of the projection lens 20. Thereby, in the light distribution pattern for high beam shown in FIG. 6B, which is obtained when the high-reflectivity treatment has been performed, the range of the light distribution can be widened downwards, as compared to the light distribution pattern for high beam shown in FIG. 6A, which is obtained when the high-reflectivity treatment has not been performed. Also, the light emitted from the second light source group 15 and reflected on the upper surface 32 of the light shade 30 is incident on the second region 20B of the incident surface 20a of the projection lens 20. Thereby, in the light distribution pattern for road surface drawing shown in FIG. 7B, which is obtained when the high-reflectivity treatment has been performed, the range of the light distribution can be widened downwards, as compared to the light distribution pattern for road surface drawing shown in FIG. 6A, which is obtained when the high-reflectivity treatment has not been performed.

On the other hand, the lower surface 31 of the light shade 30 may be subjected to the high-reflectivity treatment and the upper surface 32 may be subjected to the low-reflectivity treatment. Alternatively, the treatments may be reversely performed.

Figure 8:
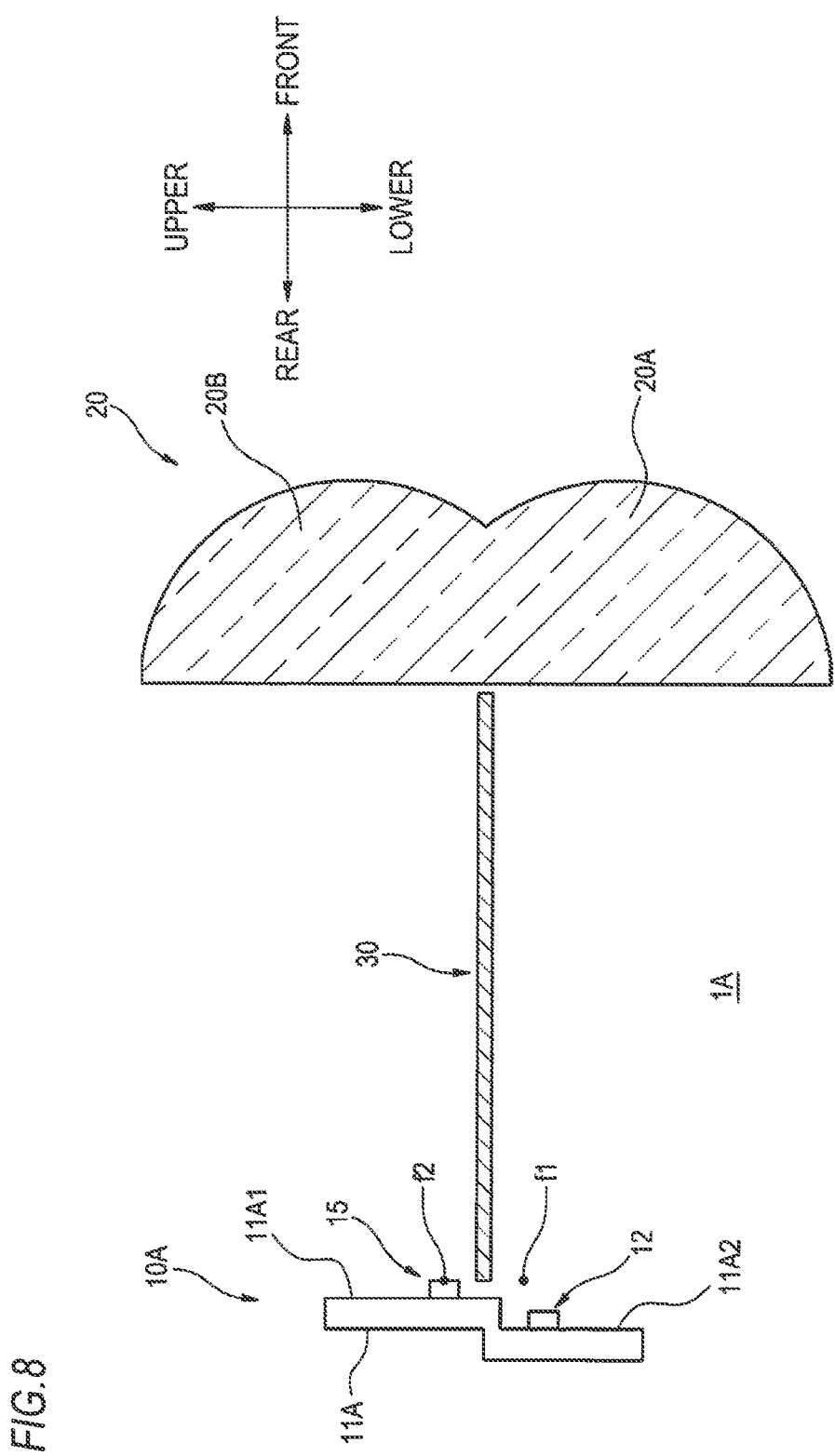
FIG. 8 is a vertically sectional view depicting a schematic structure of a vehicle lamp in accordance with a first modified embodiment of the illustrative embodiment.

FIG. 8 is a vertically sectional view depicting a schematic structure of a vehicle lamp in accordance with a first modified embodiment of the illustrative embodiment.

As shown in FIG. 8, a vehicle lamp 1A of the first modified embodiment includes a light source unit 10A having a circuit board 11A, the first light source group 12 and the second light source group 15. The circuit board 11A is bent into a stair shape in the upper and lower direction of the lamp, and has a first surface 11A1 and a second surface 11A2 bent continuously from the first surface 11A1 in the rear direction of the lamp. The first surface 11A1 is mounted thereon with the second light source group 15, and the second surface 11A2 is mounted thereon with the first light source group 12. In the vehicle lamp 1A, the light emitting surface of the second light source group 15 is arranged in the vicinity of the back focal point f2 of the second region 20B of the projection lens 20. On the other hand, the light emitting surface of the first light source group 12 is positioned at a rear side relative to the back focal point f1 of the first region 20A of the projection lens 20.

In the illustrative embodiment, as shown in FIG. 4, the light distribution pattern P having a substantially quadrangular shape is formed by the light $L_1$ from each LED chip of the first light source group 12 aligned in the right and left direction, and the plurality of light distribution patterns P having a substantially quadrangular shape is arranged in parallel in the right and left direction, so that the light distribution pattern for high beam Ph is formed. For this reason, a low-brightness part (so-called dark streak) may be formed at a boundary of the respective light distribution patterns P.

In contrast, like the modified embodiment shown in FIG. 8, when the first light source group 12 is arranged at the rear side relative to the back focal point f1 of the first region 20A of the projection lens 20, an outer peripheral portion of the light distribution pattern P having a substantially quadrangular shape is broadened by a blurring effect caused due to defocus, so that it is possible to make the boundary of each light distribution pattern P less prominent.

Figure 9:
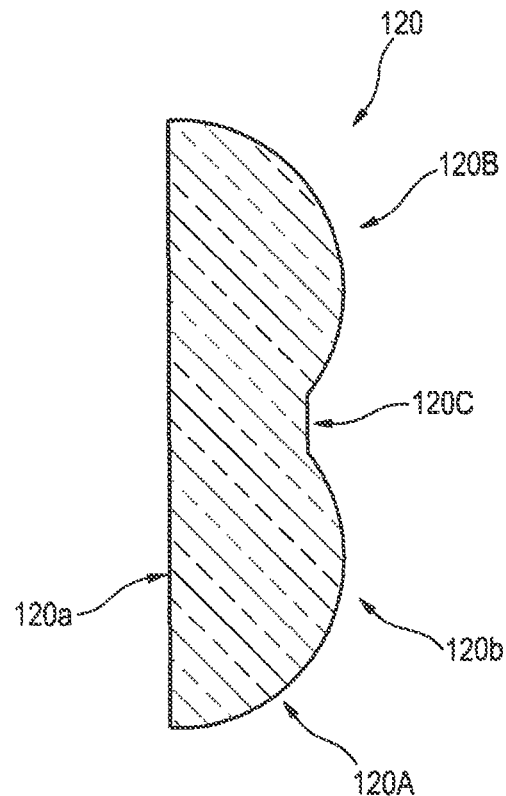
FIG. 9 is a vertically sectional view depicting a projection lens in accordance with a second modified embodiment of the illustrative embodiment.

FIG. 9 is a vertically sectional view depicting a projection lens in accordance with a second modified embodiment of the illustrative embodiment.

An output surface 120b of a projection lens 120 shown in FIG. 9 has a linear non-transparent region 120C between a first region 120A through which the light from the first light source group is to pass and a second region 120B through which the light from the second light source group is to pass. The non-transparent region 120C is preferably formed as a vapor-deposited surface on which a reflecting material such as a metal film is vapor-deposited. Thereby, the light incident on the non-transparent region 120C does not leak outwards from the output surface 120b. For this reason, it is possible to prevent an unintended light distribution, which is caused due to the light incident on a boundary between the first region 120A and the second region 120B.

In the meantime, the non-transparent region 120O may be provided on an incident surface 120a, not the output surface 120b of the projection lens 120.

Figure 10:
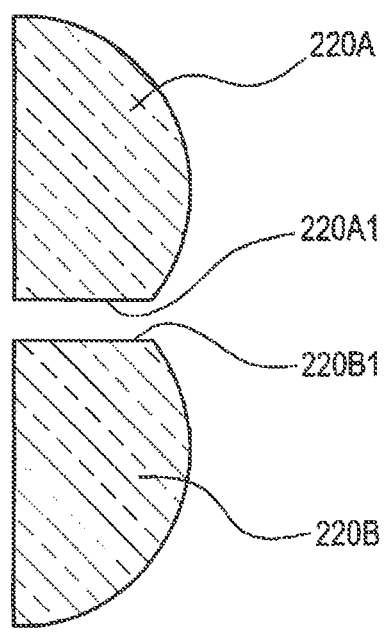
FIG. 10 is a vertically sectional view depicting a projection lens in accordance with a third modified embodiment of the illustrative embodiment.

FIG. 10 is a vertically sectional view depicting a projection lens in accordance with a third modified embodiment of the illustrative embodiment.

As shown in FIG. 10, instead of the integral projection lens 20 shown in FIG. 1 and the like, a first projection lens 220A through which the light from the first light source group 12 is to pass and a second region 220B through which the light from the second light source group 15 is to pass may be configured as separate projection lenses spaced with a predetermined interval. In this case, a lower surface 220A1 of the first projection lens 220A and an upper surface 220B1 of the second projection lens 220B may be fainted with light shading surfaces made of meal vapor-deposited surfaces, for example. In this way, the first projection lens 220A and the second projection lens 220B are separately provided, so that it is possible to easily design appropriate lens shapes so as to obtain the light distributions for forward illumination and road surface drawing. Also, since the first projection lens 220A and the second projection lens 220B are arranged with being spaced, it is possible to prevent an unintended light distribution, which is caused due to the light incident on a boundary between the projection lenses 220A, 220B.

In the meantime, the first projection lens 220A and the second projection lens 220B are not limited to the above configuration shown in FIG. 10 where they are arranged with a predetermined interval. For example, the lower surface 220A1 of the first projection lens 220A and the upper surface 220B1 of the second projection lens 220B may be contacted with a light shading surface formed of a metal vapor-deposited surface or the like being interposed therebetween.

Figure 11:
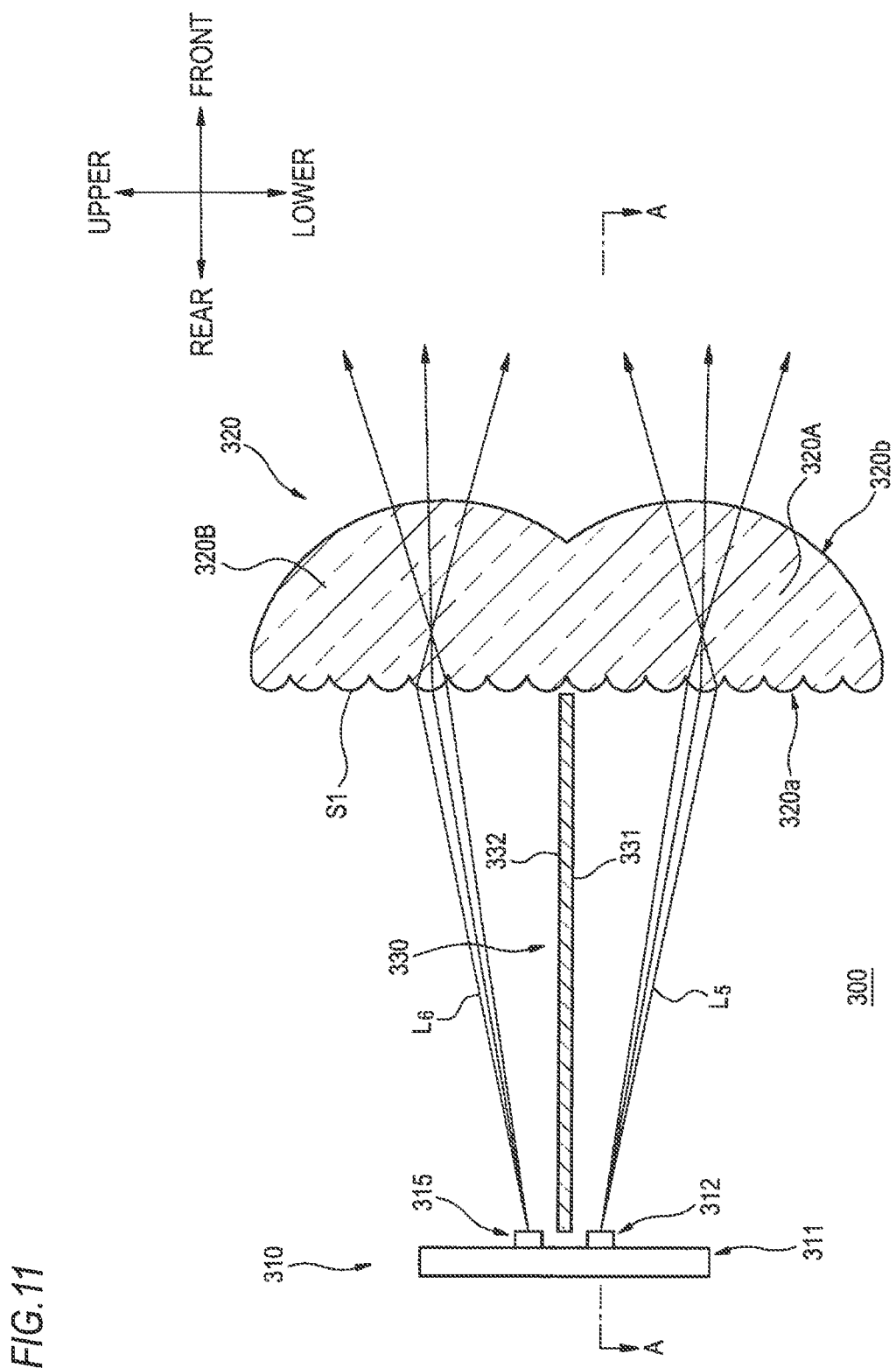
FIG. 11 is a vertically sectional view depicting a schematic structure of a vehicle lamp in accordance with a fourth modified embodiment of the illustrative embodiment.
Figure 12:
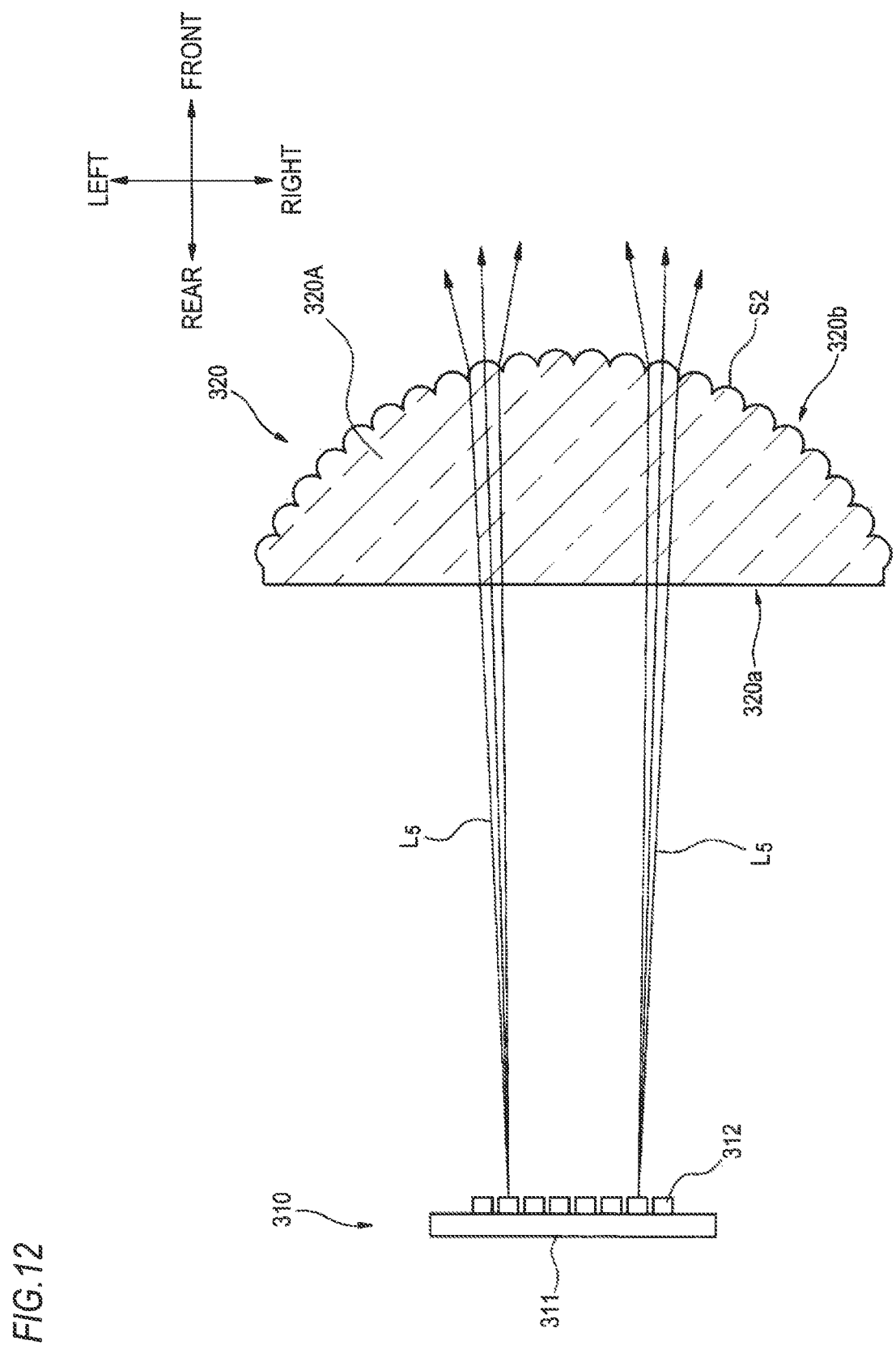
FIG. 12 is a sectional view taken along a line A-A of FIG. 11.

FIG. 11 is a vertically sectional view depicting a projection lens in accordance with a fourth modified embodiment of the illustrative embodiment, and FIG. 12 is a sectional view taken along a line A-A of FIG. 11.

As shown in FIG. 11, an incident surface 320a of a projection lens 320 is formed with a plurality of cylindrical diffusion steps S1 (an example of the first diffusion step) arranged in parallel along the upper and lower direction of the lamp. Also, as shown in FIG. 12, an output surface 320b of the projection lens 320 is formed in a first region 320A with a plurality of cylindrical diffusion steps S2 (an example of the second diffusion step) arranged in parallel along the right and left direction of the lamp.

Like this, in the first region 320A of the projection lens 320, the incident surface 320a is formed with the cylindrical steps S1 arranged in parallel in the upper and lower direction, and the output surface 320b is formed with the cylindrical steps S2 arranged in parallel in the right and left direction. Also, in a second region 320B of the projection lens 320, the incident surface 320a is formed with the cylindrical steps S1 arranged in parallel in the upper and lower direction but the output surface 320b is not formed with the diffusion step or the like. Meanwhile, the diffusion step, which is to be formed on the projection lens 320, is not limited to the cylindrical shape and may be a step having a shape of which tangential lines are continuous (an unevenness shape having tangent continuity) or a step having a shape of which curvatures are continuous (an unevenness shape having curvature continuity). Also, the diffusion step is not limited to the curved surface and may have a triangular shape or the like, for example.

In the fourth modified embodiment, since the incident surface 320a of the projection lens 320 is formed with the cylindrical steps S1 arranged in parallel along the upper and lower direction of the lamp, the light $L_5$ from the first light source group 312 is emitted outwards from the output surface 320b, as diffusion light diffusing in the upper and lower direction by the cylindrical steps S1. Also, as shown in FIG. 12, since the output surface 320b of the projection lens 320 is formed in the first region 320A with the cylindrical steps S2 arranged in parallel along the right and left direction, the light $L_5$ from the first light source group 312 is emitted outwards from the output surface 320b, as diffusion light diffusing in the right and left direction. Thereby, the light source image of the first light source group 312 passes through the projection lens 320, thereby extending subequally in the upper and lower direction and in the right and left direction.

Also, as shown in FIG. 12, the light $L_6$ emitted from the second light source group 315 is emitted outwards from the output surface 320b, as diffusion light diffusing in the upper and lower direction by the cylindrical steps S1 formed on the incident surface 320a of the projection lens 320. However, since the cylindrical steps or the like are not formed in the second region 320B of the output surface 320b of the projection lens 320, the light $L_6$ from the second light source group 315 is emitted outwards from the output surface 320b, as substantially parallel light, without diffusing in the right and left direction. Thereby, the light source image of the second light source group 315 passes through the projection lens 320, thereby further extending in the upper and lower direction than in the right and left direction.

According to the configuration of the fourth modified embodiment, like the illustrative embodiment, it is possible to form the light distribution pattern for forward illumination Ph extending subequally in the right and left direction and in the upper and lower direction by the light $L_5$ from the first light source group 312 and the light distribution pattern for road surface drawing Pr further extending in the upper and lower direction than in the right and left direction by the light $L_6$ from the second light source group 315 with a single unit.

In the fourth modified embodiment, the incident surface 320a of the projection lens 320 is formed with the cylindrical steps S1 configured to diffuse the light $L_5$ from the first light source group 312 and the light $L_6$ from the second light source group 15 so as to further extend the lights in the upper and lower direction of the lamp than in the right and left direction of the lamp. However, the disclosure is not limited thereto. For example, the incident surface 320a of the projection lens 320 may not be provided with the steps and the output surface 320b of the projection lens 320 may be formed in the second region 320B with diffusion steps (for example, the cylindrical steps) arranged in parallel in the upper and lower direction. Thereby, the output surface 320b of the projection lens 320 is formed in an upper half part, which is the second region 320B, with the cylindrical steps arranged in parallel in the upper and lower direction and is formed in a lower half part, which is the first region 320A, with the cylindrical steps S2 arranged in parallel in the right and left direction. In this case, the light source image of the second light source group 315 forms the light distribution pattern further extending in the upper and lower direction than in the right and left direction, like the third modified embodiment, and the light source image of each LED chip of the first light source group 312 forms the light distribution pattern further extending in the right and left direction than in the upper and lower direction, unlike the third modified embodiment.

Figure 13:
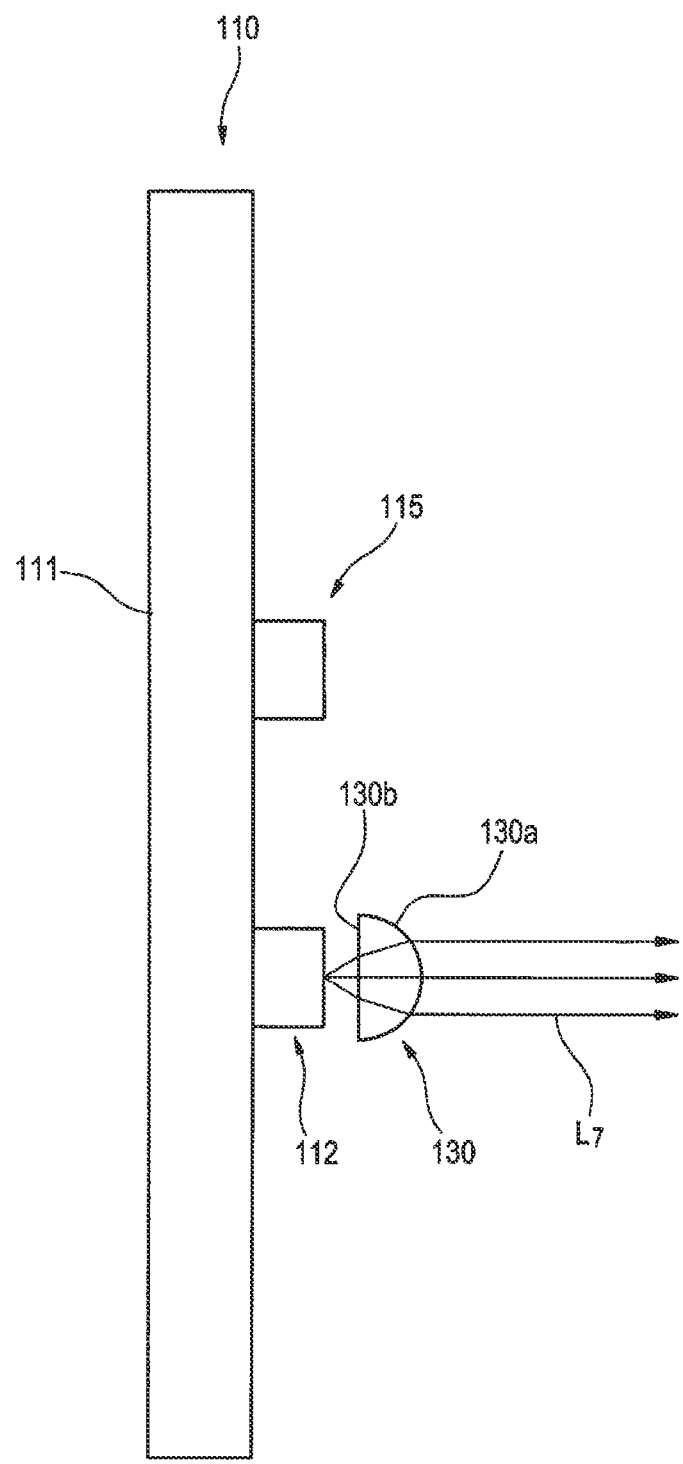
FIG. 13 is a side view of a light source unit and an additional lens in accordance with a fifth modified embodiment of the illustrative embodiment.
Figure 14:
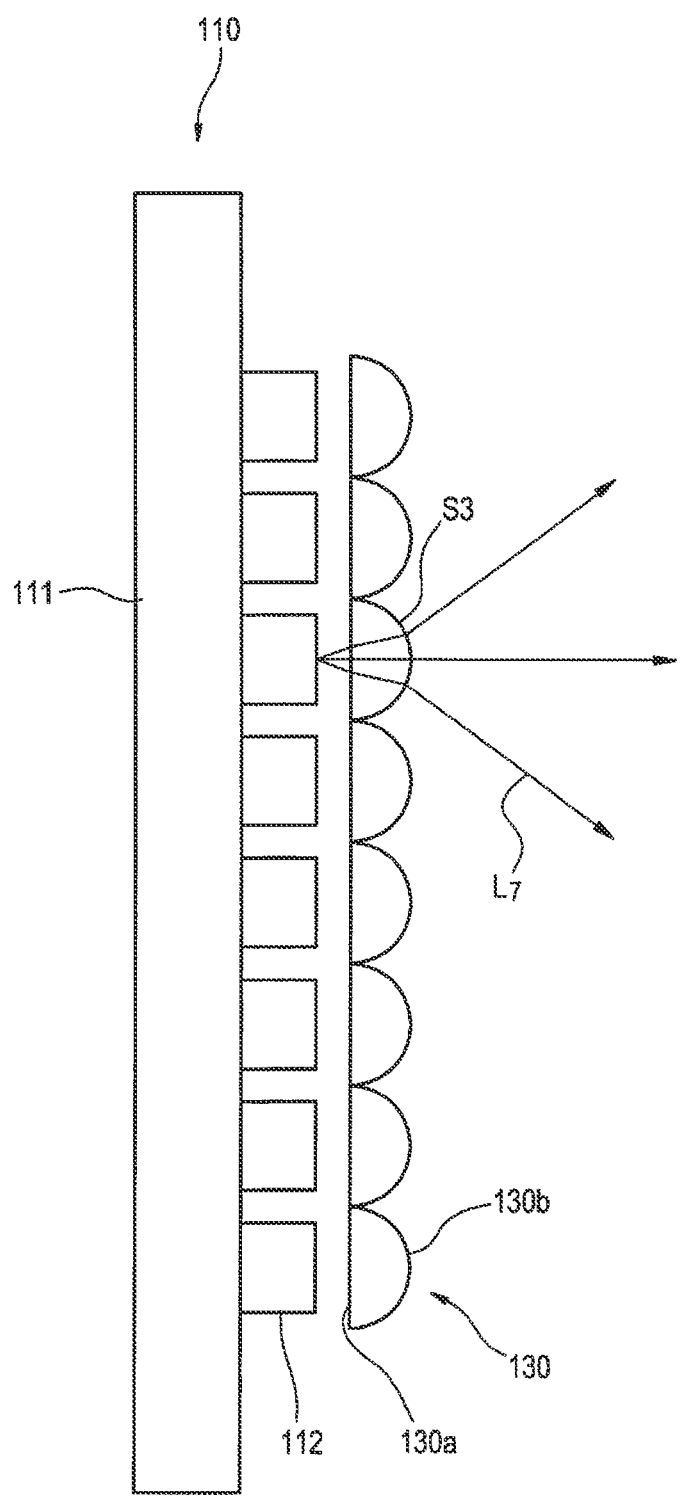
FIG. 14 is a plan view of the light source unit and the additional lens in accordance with the fifth modified embodiment.

FIG. 13 is a side view of a light source unit and an additional lens in accordance with a fifth modified embodiment of the illustrative embodiment, and FIG. 14 is a plan view of the light source unit and the additional lens shown in FIG. 13.

As shown in FIGS. 13 and 14, in the fifth modified embodiment, a plurality of additional lenses 130 is arranged to face light emitting surfaces of a first light source group 112. The additional lenses 130 are small planoconvex lenses arranged in parallel in the right and left direction so as to be close to the respective LED chips of the first light source group 112. The additional lens 130 has an incident surface 130a, which is arranged to face each LED chip of the first light source group 112 and the light to be emitted from each LED chip is to be incident thereto, and an output surface 130b arranged to face the incident surface 12a of the projection lens 120. The output surface 130b of the additional lens 130 is formed with a diffusion step S3 (a step shape is not shown) in the section in the right and left direction shown in FIG. 14. The diffusion step S3 (an example of the third diffusion step) is a plurality of cylindrical steps arranged in parallel in the right and left direction, for example. Thereby, the additional lens 130 serves as a diffusing lens in the right and left direction.

In the fifth modified embodiment, the light $L_7$ incident on the additional lens 130 from the first light source group 112 is emitted from the output surface 130b of the additional lens 130, as substantially parallel light, in the vertical section shown in FIG. 13. Meanwhile, in the section in the right and left direction shown in FIG. 14, since the output surface 130b is formed with the cylindrical steps S3 arranged in parallel along the right and left direction of the lamp, the light $L_7$ is emitted from the output surface 130b, as diffusion light diffusing in the right and left direction. That is, a light source image of the first light source group 112 passes through the additional lens 130, so that it becomes a light source image further extending in the right and left direction than in the upper and lower direction.

In the fifth modified embodiment, as the projection lens (not shown), a projection lens (a diffusing lens in the upper and lower direction) having a light distribution control function of diffusing the lights from the first light source group 112 and the second light source group 115 in the upper and lower direction is preferably used. When the projection lens is used, a light source image (a horizontally long light source image further extending in the right and left direction than in the upper and lower direction) formed by the light emitted from the first light source group 112 and having passed through the additional lens 130 passes through the projection lens, thereby further extending in the upper and lower direction than in the right and left direction. That is, the light source image of the first light source group 112 passes through the additional lens 130, which is a diffusing lens in the right and left direction, and the projection lens, which is a diffusing lens in the upper and lower direction, thereby forming the light distribution pattern Ph extending subequally in the right and left direction and in the upper and lower direction. On the other hand, the light source image of the second light source group 115 passes through the projection lens, which is a diffusing lens in the upper and lower direction, thereby forming the light distribution pattern Pr further extending in the upper and lower direction than in the right and left direction. According to this configuration, like the above illustrative embodiment, it is possible to form the light distribution pattern for forward illumination Ph extending subequally in the right and left direction and in the upper and lower direction by the light source image of the first light source group 112 and the light distribution pattern for road surface drawing Pr further extending in the upper and lower direction than in the right and left direction by the light source image of the second light source group 115, with a single unit.

Although not shown, also in the fifth modified embodiment, the light shade 30 of the illustrative embodiment may be arranged between the light source unit 110 and the projection lens. Thereby, it is possible to prevent an unintended light distribution, which is caused when the light from the first light source group 112 and the light from the second light source group 115 intersect with each other.

Figure 15A:
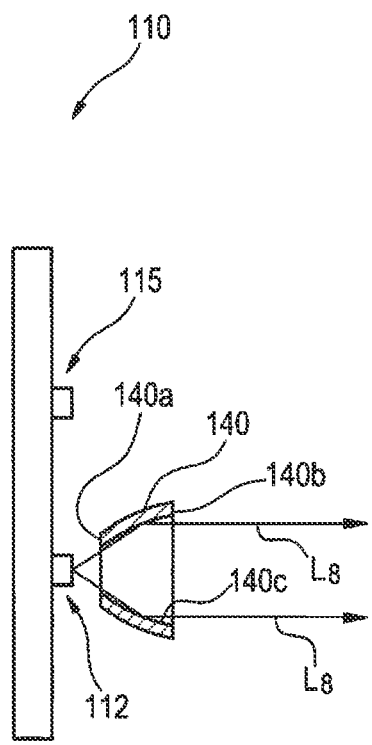
FIG. 15A is a vertically sectional view of a light source unit and a reflector in accordance with a sixth modified embodiment of the illustrative embodiment.
Figure 15B:
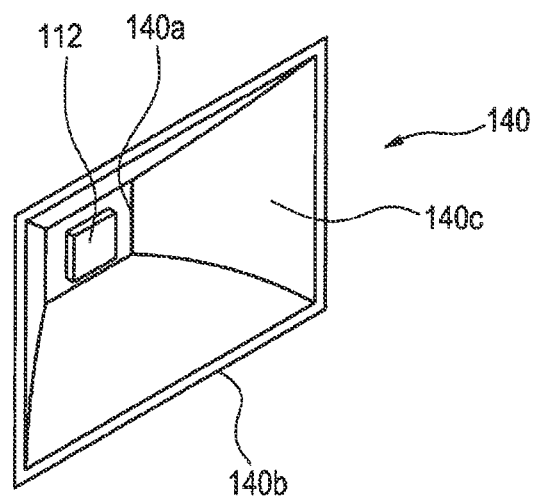
FIG. 15B is a perspective view of the reflector shown in FIG. 15A.

FIG. 15 is a vertically sectional view of a light source unit and a reflector in accordance with a sixth modified embodiment of the illustrative embodiment.

In the sixth modified embodiment, a reflector 140 is arranged in the vicinity of the first light source group 112. The reflector 140 has a rectangular box shape having openings 140a, 140b, which are respectively formed on a surface facing the first light source group 112 and a surface facing the projection lens (not shown). The opening 140a is greater than the light emitting surfaces of the respective LED chips of the first light source group 112 and the opening 140b has a horizontally long rectangular shape (wider in the right and left direction than in the upper and lower direction). The light L incident on the reflector 140 from the opening 140a facing toward the first light source group 112 is reflected on a reflecting surface 140c of the reflector 140 and is then emitted from the opening 140b. At this time, since the opening 140b at the output surface-side has a horizontally long rectangular shape, the light $L_8$ from the first light source group 112 forms a light source image further extending in the right and left direction than in the upper and lower direction in the opening 140b.

Although not shown, also in the sixth modified embodiment, a projection lens (a diffusing lens in the upper and lower direction) having cylindrical steps arranged in the upper and lower direction and formed on any one of an incident surface and an output surface thereof can be used. When the projection lens is used, the light emitted from the first light source group 112 and having passed through the reflector 140 and the light from the second light source group 115 diffuse in the upper and lower direction. Therefore, it is possible to obtain the light distribution pattern for forward illumination Ph and the light distribution pattern for road surface drawing Pr by combining the reflector 140 and the projection lens.

Also, a reflector of which a direction is rotated from the direction of the reflector 140 about an axis parallel with the optical axis of the projection lens by 90° and which has a vertically long rectangular opening may be separately arranged in the vicinity of the second light source group 115. Also in this configuration, it is possible to form the light distribution pattern Pr further extending in the upper and lower direction than in the right and left direction while forming the light distribution pattern. Ph further extending in the right and left direction than in the upper and lower direction.

Figure 16A:
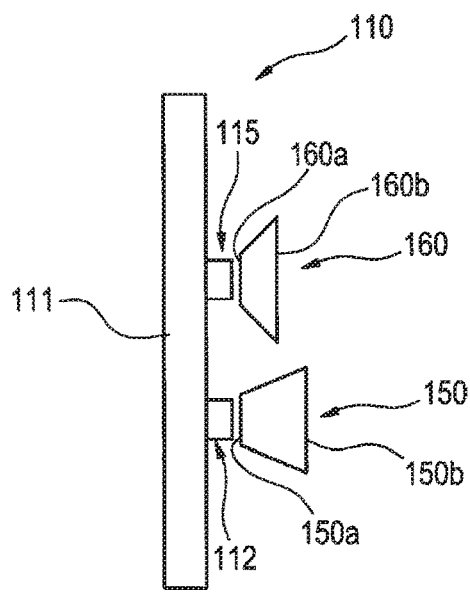
FIG. 16A is a side view of the light source unit and a light guide member in accordance with the sixth modified embodiment of the illustrative embodiment.
Figure 16B:
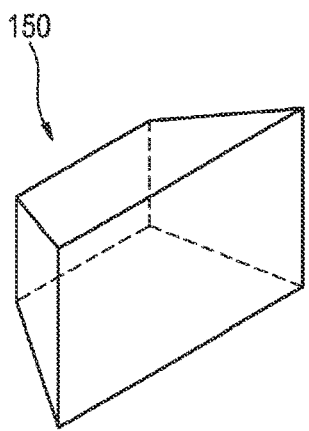
FIG. 16B is a perspective view of the light guide member shown in FIG. 16A.

FIG. 16 is a vertically sectional view of a light source unit and a light guide member in accordance with a seventh modified embodiment of the illustrative embodiment.

In the seventh modified embodiment, a light guide member 150 is arranged in the vicinity of the first light source group 112. The light guide member 150 has a substantially trapezoidal conical shape, and has an incident surface 150a arranged to face the first light source group 112 and an output surface 150b arranged to face the projection lens (not shown). The incident surface 150a is greater than the light emitting surfaces of the respective LED chips of the first light source group 112 and the output surface 150b has a horizontally long rectangular shape (wider in the right and left direction than in the upper and lower direction). The light emitted from the first light source group 112 and incident from the incident surface 150a of the light guide member 150 passes through an inside of the light guide member 150 and is then emitted from the output surface 150b. At this time, since the output surface 150b has a horizontally long rectangular shape, the light from the first light source group 112 forms a light source image further extending in the right and left direction than in the upper and lower direction on the output surface 150b.

Also, a light guide member 160 is arranged in the vicinity of the second light source group 115. The light guide member 160 has a substantially trapezoidal conical shape, and has an incident surface 160a arranged to face the second light source group 115 and an output surface 160b arranged to face the projection lens (not shown). The incident surface 160a is greater than the light emitting surface of the LED chip of the second light source group 115 and the output surface 160b has a vertically long rectangular shape (wider in the upper and lower direction than in the right and left direction). The light emitted from the second light source group 115 and incident from the incident surface 160a of the light guide member 160 passes through an inside of the light guide member 160 and is then emitted from the output surface 160b. At this time, since the output surface 160b has a vertically long rectangular shape, the light from the second light source group 115 forms a light source image further extending in the upper and lower direction than in the right and left direction on the output surface 160b.

According to this configuration, the light from the first light source group 112 can be incident on the projection lens, as a light source image further extending in the right and left direction than in the upper and lower direction, and the light from the second light source group 115 can be incident on the projection lens, as a light source image further extending in the upper and lower direction than in the right and left direction. The projection lens may be formed with a predetermined diffusion step or may have a vertically or horizontally long elliptic shape or a non-spherical surface shape.

In the meantime, a reflecting surface treatment may be performed on side surfaces except for the incident surfaces 150a, 160a and the output surfaces 150b, 160b of the light guide members 150, 160. Thereby, it is possible to improve the luminous intensity of the light to be emitted from the output surfaces 150a, 160a by totally reflecting the lights from the first light source group 112 and the second light source group 115 on the reflecting surface-treated side surfaces of the light guide members 150, 160.

Figure 17:
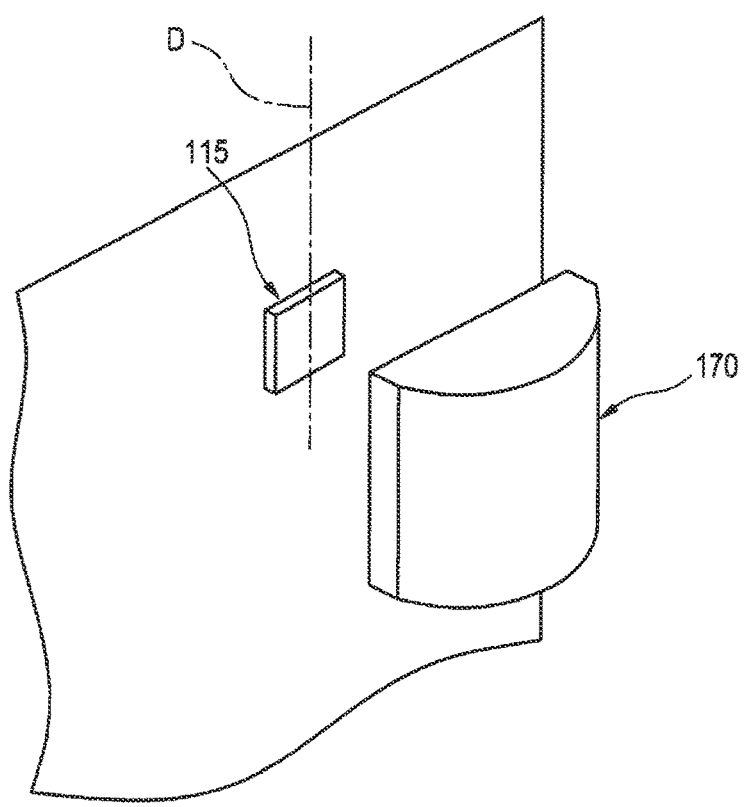
FIG. 17 is a perspective view of a light source unit and a cylindrical lens in accordance with a seventh modified embodiment of the illustrative embodiment.

FIG. 17 is a perspective view depicting a light source unit and a cylindrical lens, which are used for a vehicle lamp in accordance with an eighth modified embodiment of the illustrative embodiment.

A cylindrical lens 170 shown in FIG. 17 is a cylindrical plano-convex lens and is arranged so that a focal line direction D is a vertical direction. The cylindrical lens 170 is configured as a lens that has a curvature of a convex lens in the horizontal direction and has no curvature in the vertical direction. Thereby, only the horizontal direction of the cylindrical lens 170 acts as the plano-convex lens, so that the light is refracted in a light focusing direction. When the cylindrical lens 170 is arranged in the vicinity of the second light source group 115, for example, the light from the second light source group 115 is focused in the right and left direction, so that the light can form a light source image larger in the upper and lower direction than in the right and left direction at a stage where the light has passed through the cylindrical lens 170. Also, when a cylindrical lens of which a direction is rotated from the direction of the cylindrical lens 170 about the optical axis of the lamp by 90° is arranged in the vicinity of each LED chip of the first light source group 112, it is possible to form a light source image further extending in the right and left direction than in the upper and lower direction at a stage where the light has passed through the cylindrical lens. For this reason, it is possible to obtain the desired light distribution patterns for forward illumination and road surface drawing by combining the cylindrical lens and the projection lens.

In the meantime, a tonic lens can also be used, in place of the cylindrical lens.

Although the illustrative embodiments of the disclosure have been described, the disclosure is not limited to the illustrative embodiments and can adopt other configurations, as necessary.

The invention claimed is:

1. A vehicle lamp comprising:
   a first light source group for forward illumination comprising at least one light emitting element;
   a second light source group for road surface drawing comprising at least one light emitting element provided separately from the at least one light emitting element;
   a first projection lens through which light emitted from the first light source group is to pass;
   a second projection lens through which light emitted from the second light source group is to pass, and
   a light shade arranged between the first and second light source groups and the first and second projection lenses so that the light from the first light source group and the light from the second light source group do not intersect with each other before entering the first projection lens and the second projection lens, respectively,
wherein a light distribution control function of the first projection lens and a light distribution control function of the second projection lens are different from each other.

2. The vehicle lamp according to claim 1, wherein a position of a back focal point of the first projection lens and a position of a back focal point of the second projection lens are different from each other.

3. The vehicle lamp according to claim 1, wherein the first projection lens and the second projection lens are integrally formed.

4. The vehicle lamp according to claim 1, wherein a non-transparent region through which the lights emitted from the first light source group and the second light source group are not to pass is formed between the first projection lens and the second projection lens.

5. The vehicle lamp according to claim 4, wherein the non-transparent region is a vapor-deposited surface of a reflecting material formed on an incident surface or an output surface between the first projection lens and the second projection lens.

6. The vehicle lamp according to claim 1,
wherein the first projection lens is formed with a first diffusion step configured to extend a light source image of the first light source group subequally in a right and left direction of the lamp and in an upper and lower direction of the lamp, and
wherein the second projection lens is formed with a second diffusion step configured to further extend a light source image of the second light source group in the upper and lower direction of the lamp than in the right and left direction of the lamp.

7. The vehicle lamp according to claim 1, further comprising
a first additional optical system provided to be close to the first light source group between the first light source group and the projection lens,
wherein the first additional optical system is configured to further extend a light source image of the first light source group in a right and left direction of the lamp than in an upper and lower direction of the lamp, and
wherein the second projection lens is formed with a second diffusion step configured to further extend a light source image of the second light source group in the upper and lower direction of the lamp than in the right and left direction of the lamp.

8. The vehicle lamp according to claim 7, wherein the first additional optical system is configured by an additional lens having an incident surface arranged to face the first light source group and an output surface arranged to face the projection lens, and the output surface is formed with a third diffusion step configured to extend the light source image of the first light source group.

9. The vehicle lamp according to claim 7,
wherein the first additional optical system is configured by a reflector having openings, which are respectively formed on a surface arranged to face the first light source group and a surface arranged to face the projection lens, and
wherein the opening formed on the surface arranged to face the projection lens has a width in the right and left direction of the lamp greater than a width in the upper and lower direction of the lamp.

10. The vehicle lamp according to claim 7,
wherein the first additional optical system is configured by a light guide member having an incident surface arranged to face the first light source group and an output surface arranged to face the projection lens, and
wherein the output surface has a width in the right and left direction of the lamp greater than a width in the upper and lower direction of the lamp.

11. The vehicle lamp according to claim 7,
wherein the first additional optical system is configured by a cylindrical lens, and
wherein the cylindrical lens is arranged so that a focal line direction thereof is parallel with the right and left direction of the lamp.

12. The vehicle lamp according to claim 1, further comprising
a first additional optical system arranged between the first light source group and the first projection lens and a second additional optical system arranged between the second light source group and the second projection lens,
wherein the first additional optical system is configured to further extend a light source image of the first light source group in a right and left direction of the lamp than in an upper and lower direction of the lamp, and
wherein the second additional optical system is configured to further extend a light source image of the second light source group in the upper and lower direction of the lamp than in the right and left direction of the lamp.

13. The vehicle lamp according to claim 1,
wherein the light shade has a first surface arranged to face toward the first light source group and a second surface arranged to face toward the second light source group, and
wherein a high-reflectivity treatment has been performed for one or both of the first surface and the second surface.

14. The vehicle lamp according to claim 1,
wherein the light shade has a first surface arranged to face toward the first light source group and a second surface arranged to face toward the second light source group, and
wherein a low-reflectivity treatment has been performed for one or both of the first surface and the second surface.

15. The vehicle lamp according to claim 1,
wherein the first light source group comprises a plurality of light emitting elements, and
wherein the plurality of light emitting elements is positioned at a rear side relative to a back focal point of the first projection lens in a front and rear direction of the lamp.

16. A vehicle comprising:
the vehicle lamp according to claim 1 disposed on one of a front-right of the vehicle and a front-left of the vehicle, and
a forward illumination lamp that illuminates forward light disposed on the other of the front-right of the vehicle and the front-left of the vehicle.

* * * * *